(12) United States Patent
Su et al.

(10) Patent No.: US 9,125,240 B2
(45) Date of Patent: *Sep. 1, 2015

(54) METHOD FOR SIMULTANEOUSLY RECEIVING LTE AND 1X IN SRLTE DEVICE

(71) Applicant: Apple Inc., Cupertino, CA (US)

(72) Inventors: Li Su, San Jose, CA (US); Thanigaivelu Elangovan, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/462,464

(22) Filed: Aug. 18, 2014

(65) Prior Publication Data

US 2014/0355505 A1   Dec. 4, 2014

Related U.S. Application Data

(63) Continuation of application No. 14/037,269, filed on Sep. 25, 2013, now Pat. No. 8,811,421.

(60) Provisional application No. 61/705,761, filed on Sep. 26, 2012.

(51) Int. Cl.
| | |
|---|---|
| *H04W 74/02* | (2009.01) |
| *H04W 92/02* | (2009.01) |
| *H04W 36/28* | (2009.01) |
| *H04W 52/02* | (2009.01) |
| *H04W 76/02* | (2009.01) |

(52) U.S. Cl.
CPC .............. *H04W 92/02* (2013.01); *H04W 36/28* (2013.01); *H04W 52/02* (2013.01); *H04W 74/02* (2013.01); *H04W 76/026* (2013.01)

(58) Field of Classification Search
CPC ... H04W 74/02; H04W 52/02; H04W 76/026; H04W 92/02; H04W 36/28
USPC .......................................................... 370/311
See application file for complete search history.

(56) References Cited

U.S. PATENT DOCUMENTS

| | | |
|---|---|---|
| 2011/0026413 A1 | 2/2011 | Swarts et al. |
| 2011/0026648 A1 | 2/2011 | Swarts et al. |
| 2011/0070902 A1 | 3/2011 | Chen et al. |
| 2011/0159914 A1 | 6/2011 | Chen et al. |

FOREIGN PATENT DOCUMENTS

| | | |
|---|---|---|
| TW | 201125320 | 7/2011 |
| TW | 201136348 | 10/2011 |
| TW | 201141278 | 11/2011 |
| WO | WO2012030863 | 3/2012 |

*Primary Examiner* — Melvin Marcelo
(74) *Attorney, Agent, or Firm* — Downey Brand LLP

(57) ABSTRACT

Methods, apparatuses and computer readable media are described that configure wireless circuitry of a wireless communication device. The wireless communication device establishes a connection to a first wireless network using first and second receiving signaling chains. In response to detecting a radio frequency tune-away event, the wireless communication device reconfigures only one of the radio frequency signaling chains to receive signals from a second wireless network when a set of receive signal conditions for the second wireless network is satisfied. The wireless communication device reconfigures both of the radio frequency signaling chains to the second wireless network when the set of receive signal conditions is not satisfied.

20 Claims, 10 Drawing Sheets

METHOD FOR SIMULTANEOUSLY RECEIVING LTE AND 1X IN SRLTE DEVICE

CROSS-REFERENCE TO RELATED APPLICATIONS

This application is a continuation of U.S. application Ser. No. 14/037,269, filed on Sep. 25, 2013, entitled "METHOD FOR SIMULTANEOUSLY RECEIVING LTE AND 1X IN SRLTE DEVICE", which claims the benefit of U.S. Provisional Application No. 61/705,761, filed Sep. 26, 2012, entitled "METHOD FOR SIMULTANEOUSLY RECEIVING LTE AND 1X IN SRLTE DEVICE", which are each incorporated by reference herein in their entireties.

FIELD

The described embodiments generally relate to methods and apparatuses for managing connections between wireless communication devices and wireless networks. More particularly, the present embodiments describe configuring wireless circuitry in a single radio wireless communication device to receive signals from a Long Term Evolution (LTE) wireless network and a Code Division Multiple Access (CDMA) 2000 1x wireless network simultaneously.

BACKGROUND

Wireless networks continue to evolve as new communication technologies develop and standardize. Wireless network operators can deploy new communication technologies in parallel with earlier generation communication technologies, and wireless networks can support multiple communication technologies simultaneously to provide smooth transitions through multiple generations of wireless communication devices. Wireless communication devices can include hardware and software to support wireless connections to different types of wireless networks that use different wireless communication technologies. Wireless networks using different radio access technologies (RATs) can overlap in geographic area coverage, and wireless communication devices can support connections using different RATs depending on services and/or coverage available. A wireless service provider can provide services to wireless communication devices through overlapping wireless networks, and wireless communication devices can connect to one or more of the overlapping wireless networks. In a representative embodiment, a wireless service provider and/or a wireless communication device can include simultaneous support for a Third Generation Partnership Project (3GPP) Long Term Evolution (LTE) or Long Term Evolution Advanced (LTE-A) wireless communication protocol and a "legacy" third generation (and/or earlier generation) wireless communication protocol. Representative "legacy" protocols include the Third Generation Partnership Project 2 (3GPP2) Code Division Multiple Access (CDMA) 2000 1x (also referred to as 1xRTT or 1x) wireless communication protocol, the 3GPP Universal Mobile Telecommunications System (UMTS) wireless communication protocol, and the 3GPP Global System for Mobile Communications (GSM) wireless communication protocol.

Dual chip (also referred to as dual radio) wireless communication devices can include separate signal processing chips that each can support a different wireless communication protocol, such as a first signal processing chip for a CDMA 2000 1x wireless network and a second signal processing chip for a LTE wireless network. In particular, in a dual chip wireless communication device, each signal processing chip can include and/or be associated with its own set of receive signal processing chains, including in some instances multiple receive antennas and parallel signal processing blocks. With at least one radio frequency receive signaling chain being available to each signal processing chip independently in the dual chip wireless communication device and tunable to different carrier frequencies, signaling messages (e.g., pages) and/or references signals (e.g., for cell selection/reselection measurement) can be received independently and simultaneously from two different wireless networks, such as from the CDMA 2000 1x wireless network and from the LTE wireless network. Even when the dual chip wireless communication device is connected and actively transferring data through one of the signal processing chips to one of the wireless networks, such as the LTE wireless network, the dual chip wireless communication device can also listen for and receive a paging message or measure signals through the other parallel signal processing chip from a second wireless access network, such as the CDMA 2000 1x wireless network. Thus, the dual chip wireless communication device can establish a mobile device originating or mobile device terminating circuit switched voice connection through the CDMA 2000 1x wireless network while also being actively connected to (or simultaneously camped on) a packet switched LTE wireless network. The dual chip wireless communication device can also provide a connection on the CDMA 2000 1x wireless network, while also maintaining a connection (or at least listening for signals and messages) on the LTE wireless network. Dual chip wireless communication devices, however, can consume more power, can require a larger physical form factor and can require additional components (and cost more) than a more integrated "single chip" wireless communication device.

A single chip (also referred to as a single radio) wireless communication device, at least in some configurations, can include a signal processing chip that can support different wireless communications protocols but can be unable to be actively connected to and communicating bi-directionally with a first wireless access network and a second wireless access network simultaneously. The single radio wireless communication device can support multiple wireless communication technologies, such as connections to a CDMA 2000 1x wireless network and to an LTE wireless network, but only to one wireless network at any given time. In some configurations, a single radio wireless communication device can be limited to receiving signals that use one wireless communication technology type at a time, particularly when multiple antennas are used to receive signals for a single communication technology, e.g., when used to support multiple input multiple output (MIMO) and/or transmit or receive diversity through multiple antennas. In a representative embodiment, a single radio wireless communication device is able to connect to or camp on an evolved Universal Mobile Telecommunications System (UMTS) Terrestrial Radio Access Network (eUTRAN) of an LTE (or LTE-Advanced) wireless network and also to connect to or camp on a radio access network (RAN) of the CDMA 2000 1x wireless network, but is not able to communication bi-directionally to both wireless networks simultaneously. The single radio wireless communication device can be registered on both the LTE wireless network and on the CDMA 2000 1x wireless network and can therefore form connections with each wireless network singly but not simultaneously. The single radio wireless communication device can be connected on the LTE wireless network and can interrupt the connection to the LTE wireless network to communicate with the CDMA 2000 1x wireless network, e.g., to listen for pages, to measure signals, to provide location area updates, or to establish a connection with the CDMA 2000 1x wireless network. During the interrupted LTE connection, control signaling and data transmission between the wireless communication device and the wireless access network portion of the LTE wireless network can be interrupted. Packet transmissions and/or signaling messages from the LTE wireless network to the single radio wireless communication device can be dropped. For sufficiently long interruptions, the LTE wireless network can drop a connection with the single radio wireless communication device.

This application describes methods by which a single radio wireless communication device can be configured to operate in a multiple wireless network environment with simultaneous reception of signals from two different wireless networks.

SUMMARY

Broadly speaking, the described embodiments generally relate to methods and apparatuses for managing connections between wireless communication devices and wireless networks. More particularly, the present embodiments describe configuring wireless circuitry in a single radio wireless communication device to receive signals from a Long Term Evolution (LTE) wireless network and a Code Division Multiple Access (CDMA) 2000 1x wireless network simultaneously.

In an embodiment, a method to configure wireless circuitry in a single radio wireless communication device is described. The method comprises at least the following steps performed by the wireless communication device. In a first step, the wireless communication device establishes a connection to a first wireless network in accordance with a first wireless communication protocol using a first radio frequency signaling chain and a second radio frequency signaling chain. In a subsequent step, the wireless communication device detects a radio frequency tune-away event. In a further step, in an instance when a set of receive signal conditions for a second wireless network is satisfied, the wireless communication device reconfigures only one of the first and second radio frequency signaling chains to a second wireless network in accordance with a second wireless communication protocol. In another step, in an instance when the set of receive signal conditions for the second wireless network is not satisfied, the wireless communication device reconfigures both the first and second radio frequency signaling chains to the second wireless network in accordance with the second wireless communication protocol. In an embodiment, the first wireless network operates in accordance with a long term evolution (LTE) or long term evolution advanced (LTE-A) wireless communication protocol, and the second wireless network operates in accordance with a legacy third generation (3G) wireless communication protocol.

In another embodiment, a wireless communication device is described. The wireless communication device includes at least one or more processors, a transmitter and at least two receivers. The one or more processors are configured to control establishing and releasing connections using the transmitter and one or more of the at least two receivers between the wireless communication device and a first wireless network and between the wireless communication device and a second wireless network. The transmitter is configurable to transmit signals to the first wireless network according to a first wireless communication protocol and to the second wireless network according to a second wireless communication protocol. A first receiver is associated with the transmitter and is configurable to receive signals from the first wireless network or from the second wireless network. A second receiver is not associated with the transmitter and is configurable to receive signals from the first wireless network or from the second wireless network. The one or more processors are further configured to establish a connection to the first wireless network using the transmitter, the first receiver and the second receiver; detect a tune-away event to communicate with the second wireless network; and in response to detecting the tune-away event and when a set of receive signal conditions for the second wireless network is satisfied, reconfigure only one of the first receiver and the second receiver to the second wireless network during the tune-away event.

In another embodiment, a computer program product encoded as computer program code in a non-transitory computer readable medium for configuring wireless circuitry of a wireless communication device is disclosed. The computer program product includes computer program code for establishing a connection to a first wireless network using a transmitter, a first receiver associated with the transmitter, and a second receiver. The computer program product further includes computer program code for reconfiguring the second receiver during a tune-away event to a second wireless network and maintaining the first receiver and the transmitter connected to the first wireless network when a set of receive signal conditions for the second wireless network is satisfied. The computer program product further includes computer program code for reconfiguring both the first receiver and the second receiver during the tune-away event to the second wireless network when the set of receive signal conditions for the second wireless network is not satisfied.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The described embodiments and the advantages thereof may best be understood by reference to the following description taken in conjunction with the accompanying drawings.

DETAILED DESCRIPTION

Figure 1:
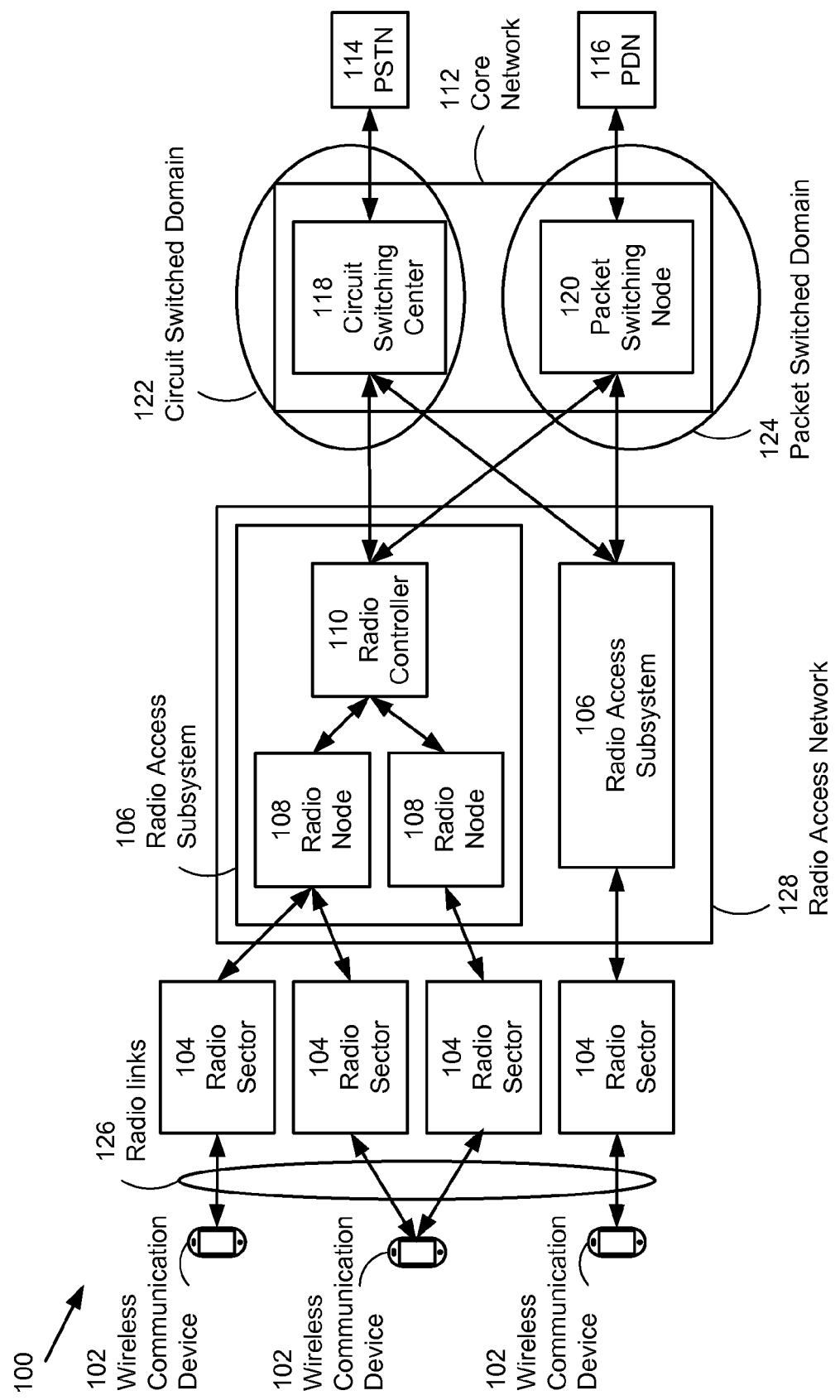
FIG. 1 illustrates components of a generic wireless communication network in accordance with some embodiments.

Wireless networks continue to evolve as network operators deploy equipment for new wireless communication technologies based on ongoing standardization efforts. Wireless communication devices can provide capabilities to communicate with wireless networks based on two or more different wireless communication technologies, e.g. GSM and UMTS, UMTS and LTE/LTE-A, or CDMA 2000 1x and LTE/LTE-A, as newer wireless network technologies offer advanced capabilities in parallel with earlier wireless network technologies that can provide greater geographic area coverage and/or different wireless service implementations. Each wireless communication technology can require different hardware and/or software processing to transmit and receive wireless signals, and a wireless communication device can include multiple, separate signal processing chips to encode and decode wireless signals according to the different wireless communication technologies, particularly for two different cellular wireless networks. A dual radio wireless communication device, for example, can include a set of wireless circuitry for communication with a CDMA 2000 1x wireless network and a second set of wireless circuitry for communication with an LTE/LTE-A wireless network. With sufficient parallel analog hardware, the dual radio wireless communication device can communicate with either wireless network independently or with both of the wireless networks simultaneously. Dual radio wireless communication devices, however, can be more complex, larger, more costly and more power intensive than single radio wireless communication devices. In some embodiments, a single radio wireless communication device can provide a simpler, smaller, more cost effective and more power efficient wireless communication device than a dual radio wireless communication device. The single radio wireless communication device can communicate bi-directionally with one wireless network at a time out of multiple wireless networks and can provide limited simultaneous communication capabilities for a set of parallel wireless networks.

A dual network, single radio wireless communication device that includes support for both CDMA 2000 1x and LTE is described as a representative device herein. The same teachings, however, can be applied to other wireless communication devices that can operate in dual (or more generally multiple) wireless communication technology networks with configurable hardware/software. In particular, the teachings disclosed herein can pertain to wireless communication devices that switch portions of wireless circuitry from one wireless technology to another wireless technology and back again, and which can be configured to receive communication from two different cellular wireless networks simultaneously.

In some embodiments, the dual network single radio wireless communication device includes support for the two different wireless networks using wireless circuitry that includes a single radio configurable to operate with each of the two wireless networks. The wireless communication device can be configured to communicate bi-directionally with one wireless network while receiving and/or measuring signals from another wireless network simultaneously.

It should be understood that implementations of the same methods and apparatuses described herein can apply to wireless communication devices that operate in different types of wireless networks, particularly one or more wireless cellular networks that offer connections using two or more different generations or types of wireless communication protocols. For example, the same teachings can be applied to a wireless communication device configured to operate with a combination of GSM and UMTS networks, LTE and UMTS networks, LTE and CDMA 2000 1x networks or other "combined" multiple radio access technology (multi-RAT) wireless networks. A specific example and implementation described herein in relation to CDMA 2000 1x-RTT and LTE wireless networks is presented for simplicity, but the methods and apparatuses disclosed herein can also apply equally to other wireless network environments that use other combinations of wireless access communication protocols. The methods and apparatuses described herein can apply to wireless communication devices in which a connection to a first wireless network is interrupted to support communication with a second wireless network and then later resumed. Interruption of the connection between the wireless communication device and the first wireless network can occur when the wireless communication device configures one or more receivers to operate on the second wireless network, e.g., to listen for signaling messages or measure signals from the second wireless network, thereby interrupting a connection to the first wireless network.

In some embodiments described herein, a single radio wireless communication device can be capable of transmitting and receiving wireless radio frequency signals from an LTE wireless network or from a CDMA 2000 1x wireless network individually but not able to transmit and receive simultaneously with both wireless networks simultaneously. In some embodiments, the single radio wireless communication device can be configured to receive radio frequency signals from the LTE wireless network and from the CDMA 2000 1x wireless network simultaneously, while being able to transmit radio frequency signals with only one of the wireless networks. Initially, the single radio wireless communication device can be associated with the LTE wireless network, e.g. connected to or camped on the LTE wireless network. The single radio wireless communication device can be registered simultaneously with both the LTE wireless network and with the CDMA 2000 1x wireless network, and thus can be configured to establish connections with either the LTE wireless network or with the CDMA 2000 1x wireless network. In some embodiments, a set of services, e.g., circuitry switched voice connections, can be provided by the CDMA 2000 1x wireless network and can be not available through the LTE wireless network, which can offer packet switched services only. The single radio wireless communication device can interrupt a packet switched data connection with the LTE wireless network in order to communicate with and/or receive signals from the CDMA 2000 1x wireless network, e.g., to listen for a page addressed to the wireless communication device for a mobile terminated circuit switched voice connection to the CDMA 2000 1x wireless network, to establish a mobile originated circuitry switched connection with the CDMA 2000 1x wireless network, to provide a location area update message to maintain registration with the CDMA 2000 1x wireless network, or to measure a serving cell and/or neighbor cells of the CDMA 2000 1x wireless network. The single radio wireless communication device can suspend a packet switched data connection with the LTE wireless network in order to communicate with and/or listen to the CDMA 2000 1x wireless network. In some embodiments, the LTE wireless network can be unaware when the wireless communication device suspends communication and can observe a gap in communication between the LTE wireless network and the wireless communication device. The single radio wireless communication device can configure radio frequency (RF) wireless circuitry contained in the single radio wireless communication device to "tune away" away from the LTE wireless network and "tune to" the CDMA 2000 1x wireless network to receive signals from and/or transmit signals to the CDMA 2000 1x wireless network. The single radio wireless communication device can subsequently re-configure the wireless circuitry to "tune back" to the LTE wireless network. Interruption of a packet switched data connection (and of a parallel higher layer signaling connection) to the LTE wireless network can be accommodated without the LTE wireless connection being dropped, e.g., when the interruption is shorter than one or more inactivity timer expiration limits or other timer limits that would precipitate dropping the connection between the LTE wireless network and the single radio wireless communication device. Active data transfer between the LTE wireless network and the single radio wireless communication device as well as signaling messages during the suspension period can be interrupted and later resumed when the wireless communication device returns to the LTE wireless network.

In an embodiment, the single radio wireless communication device can include wireless circuitry that can be configured for one of four different operating modes. The wireless circuitry can include a transmitter (TX) and a first receiver (RX0) that can each be tuned to a different carrier frequency, e.g., using separate voltage controlled crystal oscillators (VCXOs), which can referred to as a TX-VCXO, and an RX0-VCXO, and a second receiver (RX1) that can be tuned to the same carrier frequency as the first receiver RX0 using the RX0-VCXO or to a different carrier frequency, e.g., using a second receive VCXO, which can be referred as an RX1-VCXO. In a default operating configuration, which can be referred to as "mode 1" herein, the single radio wireless communication device can be configured to communicate with an LTE wireless network using the transmitter TX and both receivers RX0 and RX1. In some embodiments, an LTE wireless communication protocol can require the wireless communication device support a dual receiver capability to provide a set of high downlink (DL) data rate transfers in a multiple input multiple output (MIMO) mode and/or for DL transmit diversity. In mode 1, the single radio wireless communication device can be unable to communicate with (transmit to or receive from) a second wireless network, e.g., a legacy CDMA 2000 1x wireless network as all of the wireless circuitry in the single radio wireless communication device can be configured to support communication to and from the LTE wireless network. The single radio wireless communication device, however, can be registered with the CDMA 2000 1x wireless network and can reconfigure itself to listen for pages (e.g., for incoming MT voice connections), measure signals, or to otherwise listen and/or transmit to the CDMA 2000 1x wireless network using additional configuration modes.

In some embodiments, in a second configuration, which can be referred to herein as "mode 4," the single radio wireless communication device can be configured to communicate with the second wireless network, e.g., the CDMA 2000 1x wireless network, using the transmitter TX and both receivers RX0 and RX1, providing a transmit path and a receive diversity path for communication with the CDMA 2000 1x wireless network. By configuring the single radio wireless communication device to use mode 1 or mode 4, the transmitter TX and both receivers RX0 and RX1 of the single radio wireless communication device can be dedicated to communicate bi-directionally with either the LTE wireless network or with the CDMA 2000 1x wireless network and can be not split to communicate with two different wireless networks simultaneously. With inclusion of an independent frequency control, e.g., the RX1-VCXO, however, the single radio wireless communication device can be configured to allocate one receiver to each wireless network, thereby permitting reception of signals from a second wireless network in parallel with communication to and from a first wireless network, as described further herein.

In an embodiment, the single radio wireless communication device can be configured to a third configuration, which can be referred to herein as "mode 2," to use the transmitter TX (using the TX-VCXO) and the first receiver RX0 (using the RX0-VCXO) in combination to communicate bi-directionally with the LTE wireless network and to use the second receiver RX1 (using the RX1-VCXO) to listen for signaling messages and/or to measure signals received from the CDMA 2000 1x wireless network (or from one or more other wireless networks) in parallel. In mode 2, the single radio wireless communication device can be able to maintain full communication with the LTE wireless network, without the highest data rate MIMO downlink configurations that can require multiple receivers simultaneously tuned to the LTE wireless network, while also listening for signaling messages, e.g., pages, from the CDMA 2000 1x wireless network and/or measuring cell strength or quality for a serving cell and/or neighbor cells of the CDMA 2000 1x wireless network. In mode 2, in some embodiments, the single radio wireless communication device can also measure signals from wireless networks using "other" radio access technologies, e.g., for inter-radio access technology (iRAT) measurements, e.g., by tuning the second receiver RX1 (using the RX1-VCXO) to another carrier frequency used by a wireless network operating an alternative radio access technology. Mode 2 can prove useful for monitoring the CDMA 2000 1x wireless network during a wake time period of a discontinuous receive (DRX) cycle of the CDMA 2000 1x wireless network and for measuring cells for cell selection and/or reselection for non-LTE wireless networks.

In an embodiment, the single radio wireless communication device can be configured to a fourth configuration, which can be referred to herein as "mode 3," to use the transmitter TX and the first receiver RX0 (using the RX0-VCXO) in combination to communicate with the CDMA 2000 1x wireless network and to use the second receiver RX1 (using the RX1-VCXO) to listen for signaling messages and/or to measure signals from the LTE wireless network (or from one or more other wireless networks). In mode 3, the single radio wireless communication device can be able to communicate bi-directionally with the CDMA 2000 1x wireless network, while listening for messages or measuring signals from the LTE wireless network. Mode 3 can be used when bi-directional communication with the CDMA 2000 1x wireless network does not require the use of both receivers as provided for in mode 4; thus receive diversity for reception of signals from the CDMA 2000 1x wireless network or the LTE wireless network is not supported in mode 3, but under "good" signal operating conditions, receive diversity may not be required for communication with the CDMA 2000 1x wireless network. Mode 3 can be used for a connection with the CDMA 2000 1x wireless network, e.g., a circuit switched voice connection in a CSFB procedure, while simultaneously receiving signaling messages and/or measuring cells of the LTE wireless network in parallel.

The single radio wireless communication device can determine in which mode to operate based on requirements for communication with and/or monitoring of signals associated with one or more parallel wireless networks. In some embodiments, the single radio wireless communication device can determine whether a set of receive signal conditions is satisfied when determining in which mode to operate, e.g., when "good" signal conditions prevail and reception from two wireless networks is preferred, the wireless communication device can operate in a mode that assigns a first receiver to a first wireless network and a second receiver to a second wireless network, and when "poor" signal conditions exist, the single radio wireless communication device can operate in a mode that assigns both the first and second receivers to either the first wireless network or the second wireless network, depending on a requirement for use and a prioritization of use for the two wireless networks.

FIG. 1 illustrates a representative "generic" wireless network 100 that can include multiple wireless communication devices 102 connected by radio links 126 to radio sectors 104 provided by a radio access network 128. Each radio sector 104 can represent a geographic area of radio coverage emanating from an associated radio node 108 using a radio frequency channel operating at a selected frequency. Each radio node 108 can generate one or more radio sectors 104 to which the wireless communication device 102 can connect by one or more radio links 126. In some wireless networks 100, the wireless communication device 102 can be connected to more than one radio sector 104 simultaneously. The multiple radio sectors 104 to which the wireless communication device 102 can be connected can emanate from a single radio node 108 or from separate radio nodes 108 that can share a common radio controller 110. A group of radio nodes 108 together with the associated radio controller 110 can be referred to as a radio access subsystem 106. Typically each radio node 108 in a radio access subsystem 106 can include a set of radio frequency transmitting and receiving equipment mounted on an antenna tower, and the radio controller 110 connected to the radio nodes 108 can include electronic equipment for controlling and processing transmitted and received radio frequency signals. The radio controller 110 can manage the establishment, maintenance and release of the radio links 126 that connect the wireless communication device 102 to the radio access network 128.

Radio resources that form the radio links 126 in the radio sectors 104 can be shared among multiple wireless communication devices 102 using a number of different multiplexing techniques, including time division, frequency division, code division, space division, and combinations thereof. A radio resource control (RRC) signaling connection can be used to communicate between the wireless communication device 102 and the radio controller 110 in the radio access subsystem 106 of the radio access network 128 including requests for and dynamic allocations of radio resources to multiple wireless communication devices 102. Suspension of allocation of radio resources to a wireless communication device 102 can occur without dis-establishing the radio resource signaling connection to the wireless communication device 102.

The radio access network 128, which provides radio frequency air link connections to the wireless communication device 102, connects also to a core network 112 that can include a circuit switched domain 122, usually used for voice traffic, and a packet switched domain 124, usually used for data traffic. Radio controllers 110 in the radio access subsystems 106 of the radio access network 128 can connect to both a circuit switching center 118 in the circuit switched domain 122 and a packet switching node 120 in the packet switched domain of the core network 112. The circuit switching center 118 can route circuit switched traffic, such as a voice call, to a public switched telephone network (PSTN) 114. The packet switching node 120 can route packet switched traffic, such as a "connectionless" set of data packets, to a public data network (PDN) 116.

Figure 2:
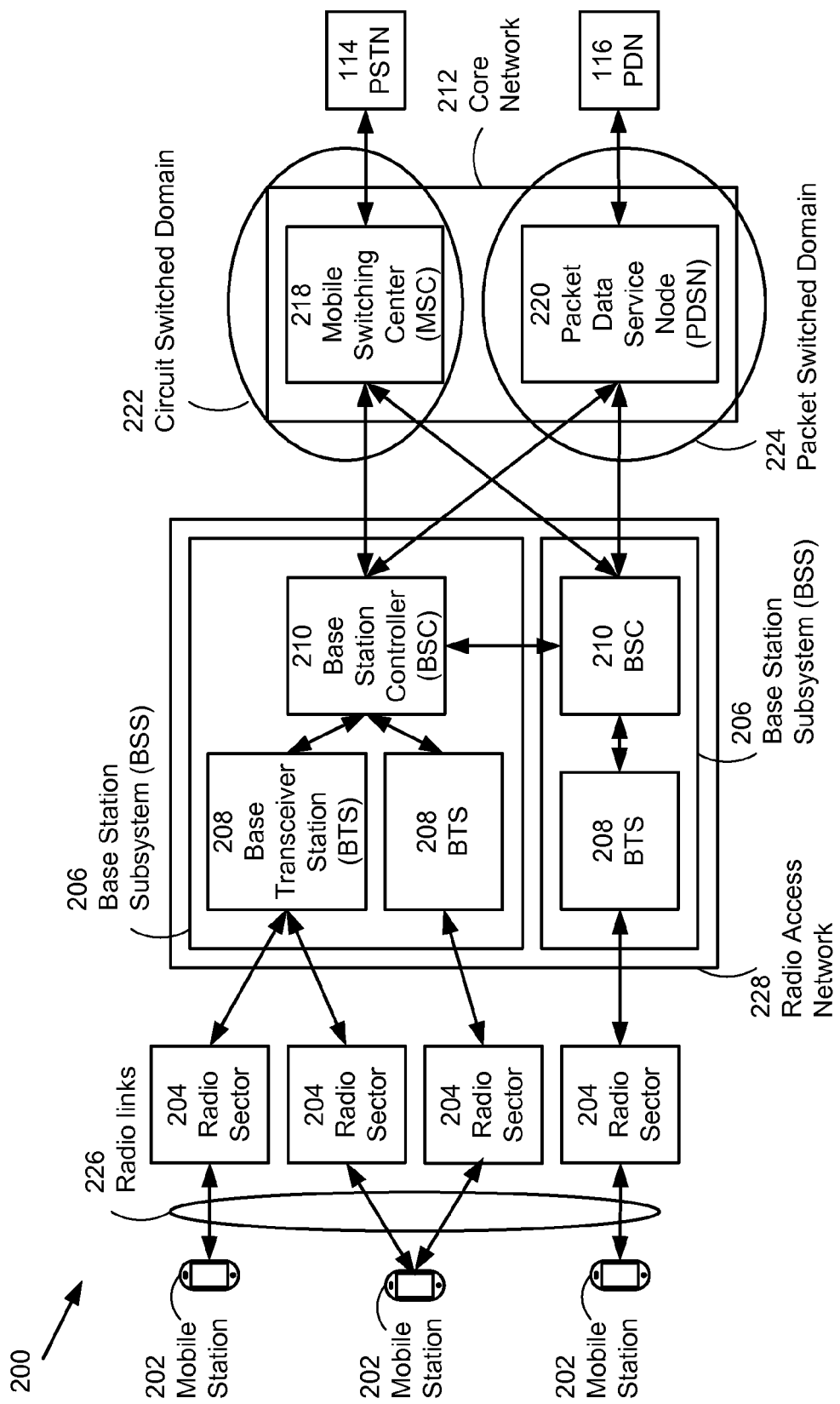
FIG. 2 illustrates components of a CDMA 2000 1x (RTT or EV-DO) wireless communication network in accordance with some embodiments.

FIG. 2 illustrates a representative CDMA 2000 1x wireless network 200 that can include elements comparable to those described for the "generic" wireless network 100 shown in FIG. 1. Multiple mobile stations 202 can connect to one or more radio sectors 204 through radio frequency links 226. Each radio sector 204 can radiate outward from a base transceiver station (BTS) 208 that can connect to a base station controller (BSC) 210, together forming a base station subsystem (BSS) 206. Multiple base station subsystems 206 can be aggregated to form a radio access network 228. Base station controllers 210 in different base station subsystems 206 can be interconnected. The base station controllers 210 can connect to both a circuit switched domain 222 that use multiple mobile switching centers (MSC) 218 and a packet switched domain 224 formed with packet data service nodes (PDSN) 220, which together can form a core network 212 for the wireless network 200. As with the generic wireless network 100 described above, the circuit switched domain 222 of the core network 212 can interconnect to the PSTN 114, while the packet switched domain 224 of the core network 212 can interconnect to the PDN 116. Establishing connections on the CDMA 2000 1x wireless network 200 can depend on the mobile station 202 receiving a page from the BSS 206 indicating an incoming connection. The mobile station 202 can be required to listen for pages during specific paging intervals. Without reception of the page, the mobile station 202 can be unaware of a request to form a connection between the mobile station 202 and the CDMA 2000 1x wireless network 200. In some embodiments, the mobile station 202 can operate in a discontinuous receive (DRX) mode with respect to the CDMA 2000 1x wireless network 200, e.g., "sleeping" during certain time periods and "waking" during short intervals to listen for paging messages. As the wireless circuitry that supports transmission and reception of radio frequency signals can be not required during the "sleep" time periods, the mobile station 202 can reconfigure wireless circuitry for use on another wireless network during those time periods. During the "wake" time period, the mobile station 202 can configure a portion of the wireless circuitry to listen for paging messages and also to measure receive signals from a serving cell and/or neighbor cells. In some embodiments, the mobile station 202 can configure another portion of the wireless circuitry to remain connected to (transmit and receive) or listen for and/or measure (receive only) signals from another network, while also receiving paging messages on the CDMA 2000 1x wireless network 200.

Figure 3:
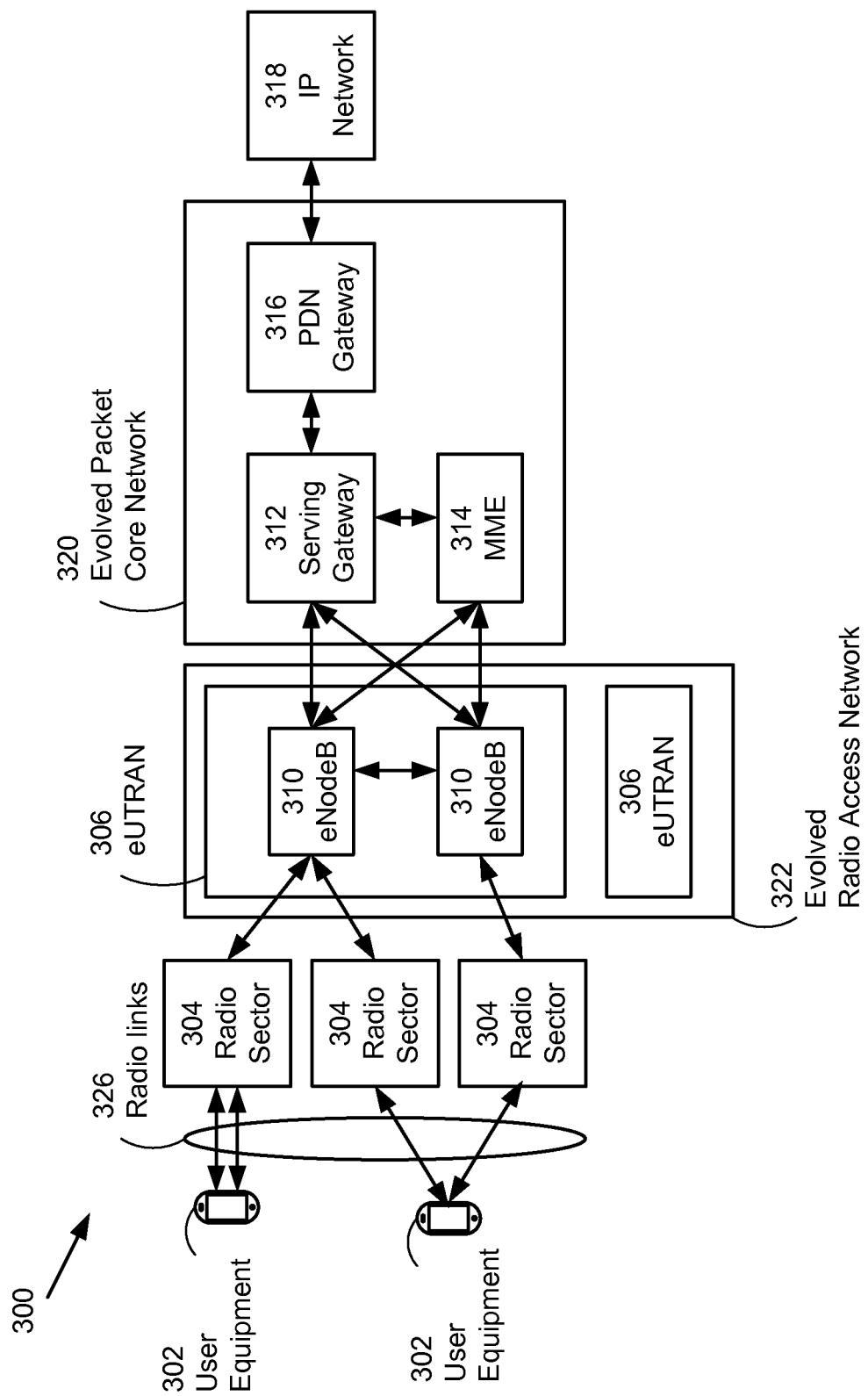
FIG. 3 illustrates components of an LTE (or LTE-Advanced) wireless communication network in accordance with some embodiments.

FIG. 3 illustrates a representative Long Term Evolution (LTE) wireless network 300 architecture designed as a packet switched network exclusively. A user equipment 302 can connect to an evolved radio access network 322 through radio links 326 associated with radio sectors 304 that emanate from evolved Node B's (eNodeB) 310. The eNodeB 310 can include the functions of both transmitting and receiving base stations (such as the BTS 208 in the CDMA 2000 1x wireless network 200) as well as base station radio controllers (such as the BSC 210 in the CDMA 2000 1x wireless network 200). The equivalent core network of the LTE wireless network 300 is an evolved packet core network 320 including serving gateways 312 that interconnect the evolved radio access network 322 to public data network (PDN) gateways 316 that connect to external internet protocol (IP) networks 318. Multiple eNodeB 310 can be grouped together to form an eUTRAN 306. The eNodeB 310 can also be connected to a mobility management entity (MME) 314 that can provide control over connections for the user equipment 302. The eNodeB 310 can control allocation of radio resources for the radio links 326 to the user equipment 302. The eNodeB 310 can communicate paging messages to the user equipment 302, including paging messages to establish an RRC connection with the user equipment 302 and transition from an RRC idle state to an RRC connected state. The user equipment 302 can be required to be in an RRC connected state in order to communicate application data packets and signaling messages.

Figure 4:
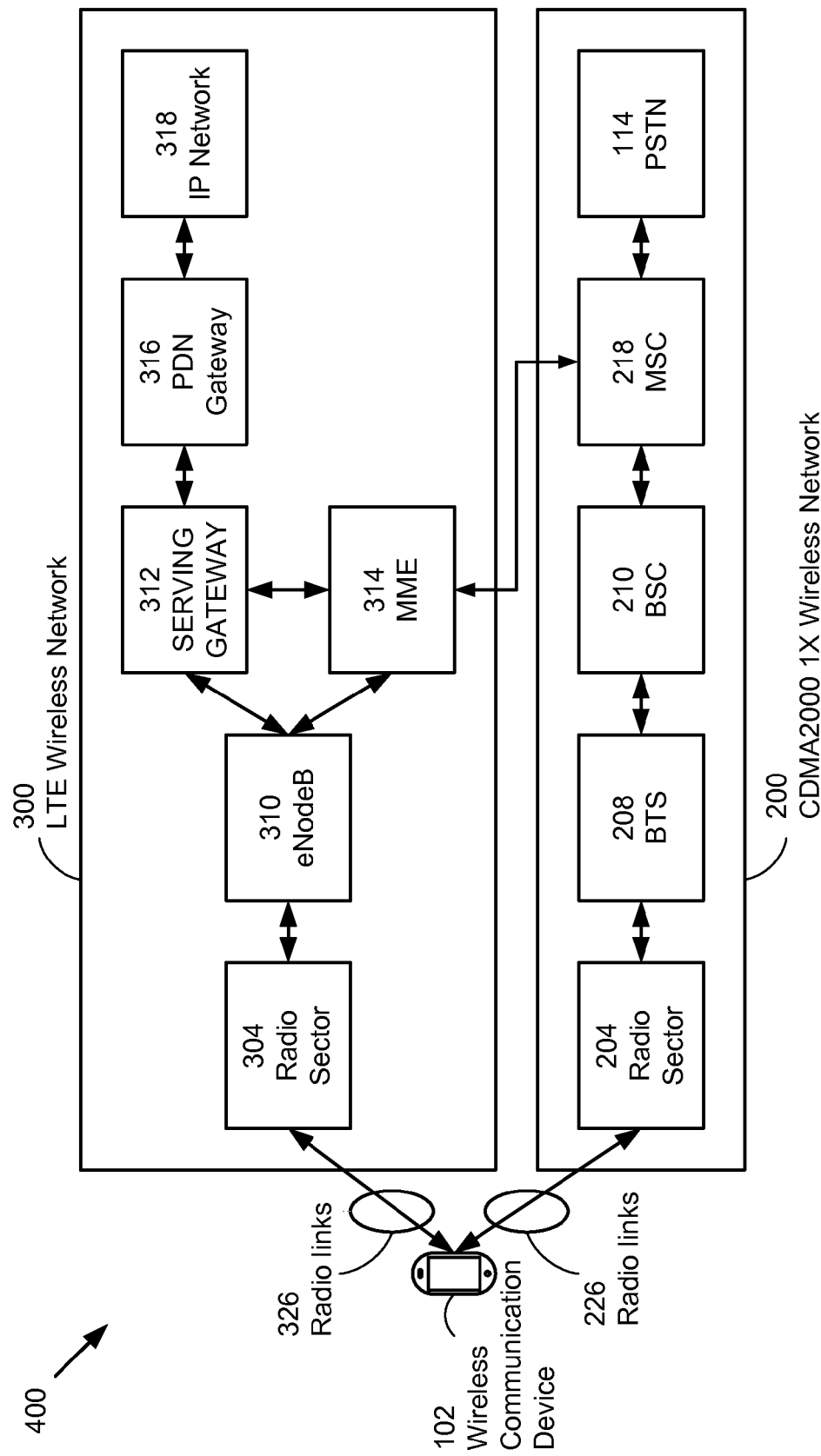
FIG. 4 illustrates a wireless communication device connected in parallel with the CDMA 2000 1x (RTT or EV-DO) wireless communication network of FIG. 2 and with the LTE (or LTE-Advanced) wireless communication network of FIG. 4 in accordance with some embodiments.

FIG. 4 illustrates a diagram 400 of a wireless communication device 102 in communication with both the LTE wireless network 300 and with the CDMA 2000 1x wireless network 200. (The generic term "wireless communication device" 102 shall be used hereinafter to denote a mobile terminal, a mobile station, a user equipment, or other comparable recognized term for a mobile wireless device that can connect through a wireless access network to one or more wireless networks.) The CDMA 2000 1x wireless network 200 can connect to the circuit switch based public switched telephone network (PSTN) 114 through a mobile switching center (MSC) 218. The CDMA 2000 1x wireless network 200 can provide circuit switched services, e.g., circuit switched voice connections for the wireless communication device 102, such as used in a circuit switched fallback (CSFB) procedure. The MSC 218 of the CDMA 2000 1x wireless network 200 can be interconnected to the MME 314 of the LTE wireless network 300 to coordinate call signaling for the wireless communication device 102. In some embodiments, the CDMA 2000 1x wireless network 200 can seek to establish a connection through the radio links 226 with the wireless communication device 102, e.g. to establish a voice connection between the wireless communication device 102 and the PSTN 114. The CDMA 2000 1x wireless network 200 can transmit a page message to the wireless communication device 102 using the radio links 226 to indicate the availability of an incoming voice connection. Unless a receiver in the wireless communication device 102 is tuned to listen for the page message from the CDMA 2000 1x wireless network 200 during the appropriate paging interval, the wireless communication device 102 can be connected to the LTE wireless network 300 during the paging interval and can be unaware of an attempt to form a mobile terminated voice connection. A single radio wireless communication device 102 can be configured to communicate (transmit and receive) radio frequency signals with only one wireless network at a time. In some embodiments, the single radio wireless communication device 102 can be configured to communicate with one wireless network while simultaneously listening to and/or measuring signals from one or more other wireless networks, as described further herein. The single radio wireless communication device 102 can be normally configured to communicate with the LTE wireless network 300 and to listen periodically for page messages from the CDMA 2000 1x wireless network 200 by tuning a receiver in the single radio wireless communication device 102 from the LTE wireless network 300 to the CDMA 2000 1x wireless network 200 temporarily and subsequently re-tuning the receiver back to the LTE wireless network 300. In order to receive signaling messages and/or data packets from the LTE wireless network 300 the single radio wireless communication device 102 can listen for paging messages from the CDMA 2000 1x wireless network 200 using one receiver and can maintain another receiver tuned to the LTE wireless network 300.

Figure 5:
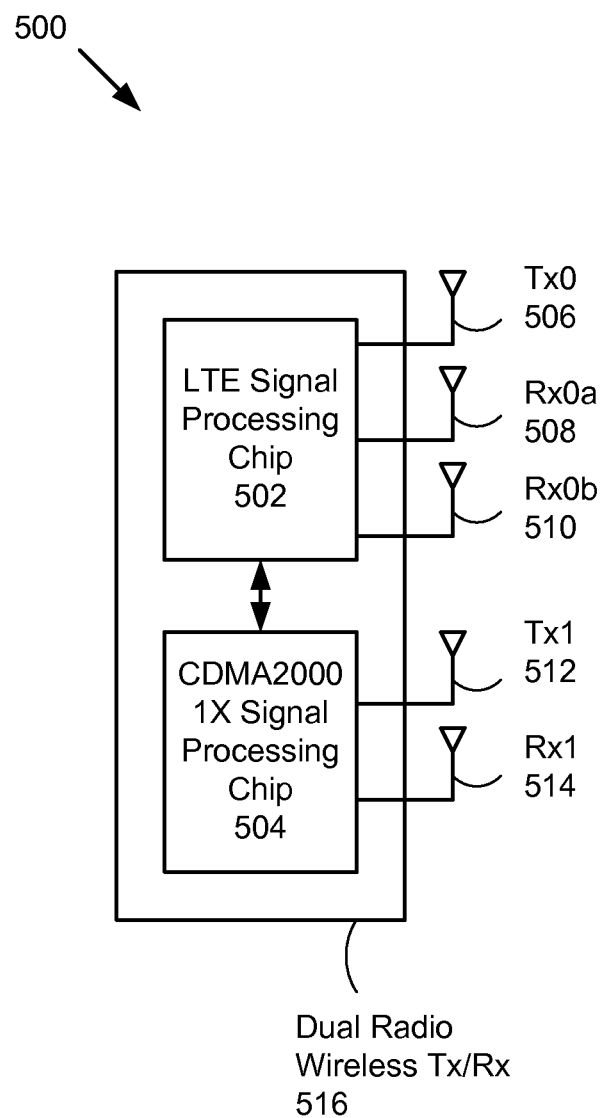
FIG. 5 illustrates elements of a wireless communication device including multiple wireless signal processing chips in accordance with some embodiments.

FIG. 5 illustrates select wireless signal processing elements 500 that can be contained in a dual radio wireless transmitter/receiver (TX/RX) 516 of a dual radio wireless communication device 102. An LTE signal processing chip 502 can be used to provide connections between the dual radio wireless communication device 102 and the LTE wireless network 300, while a CDMA 2000 1x signal processing chip 504 can be used to provide connections between the dual radio wireless communication device 102 and the CDMA 2000 1x wireless network 200. Each signal processing chip can be connected to a set of antennas (and other accompanying wireless circuitry) through which radio frequency signals can be transmitted to and received from respective wireless networks. The LTE signal processing chip 502 can be connected to a transmitting antenna 506 and to a pair of receive antennas 508/510. Multiple receive antennas can be used to improve performance through various forms of receive diversity and can be required based on a standardized wireless communication protocol, e.g., to support high data rates through MIMO transmission. With the separate CDMA 2000 1x signal processing chip 504, the dual radio wireless communication device 102 can transmit and receive radio frequency signals with the CDMA 2000 1x wireless network 200 through a transmit antenna 512 and a receive antenna 514, while simultaneously transmitting and receiving radio frequency signals with the LTE wireless network 300 through the separate transmit antenna 506 and receive antennas 508/510. The LTE signal processing chip 502 and the CDMA 2000 1x signal processing chip 504 can be connected to each other in order to coordinate radio frequency signal communication with their respective wireless networks. The dual radio wireless transmitter/receiver 516, while flexible, can be more expensive, consume more power and occupy more space than a compact, low power single radio wireless transmitter/receiver, a representative embodiment of which is illustrated in FIG. 6.

Figure 6:
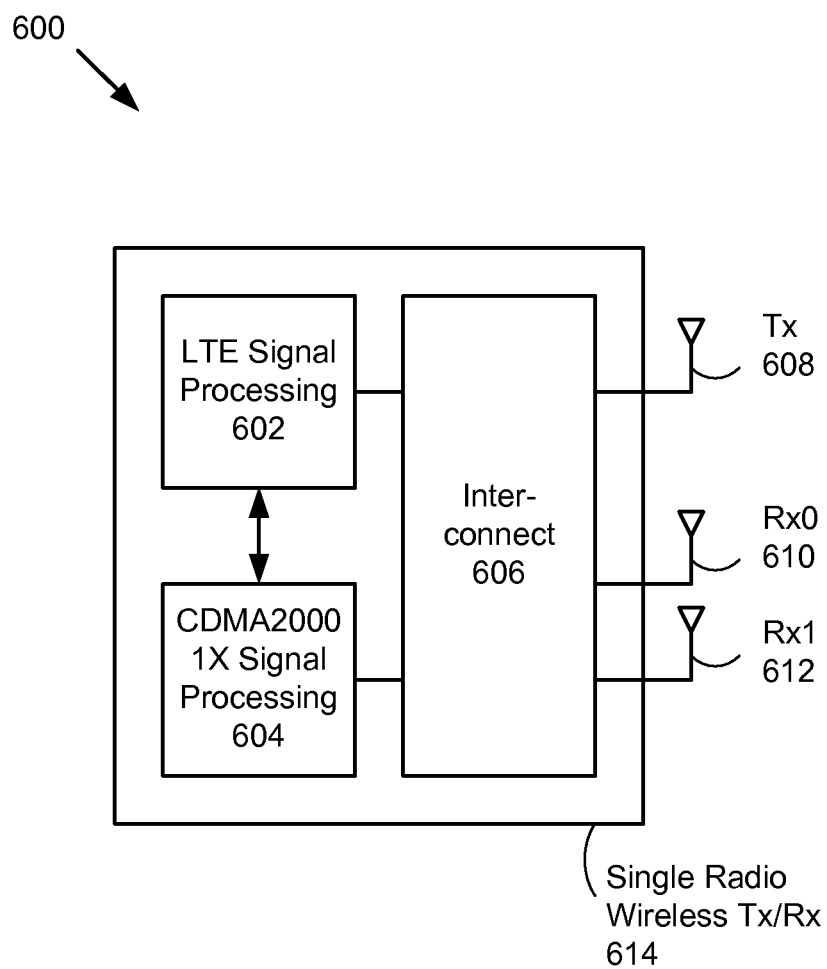
FIG. 6 illustrates elements of a representative wireless communication device that includes a single signal processing chip that supports multiple wireless networks in accordance with some embodiments.

FIG. 6 illustrates a diagram 600 of single radio wireless transmitter/receiver 614 that can reside in a single radio wireless communication device 102 that can communicate (transmit and receive) with the LTE wireless network 300 or with the CDMA 2000 1x wireless network 200 separately but not simultaneously. When connected to the LTE wireless network 300, the single radio wireless communication device 102 can use a single transmitter (Tx) 608 and dual receivers (Rx) 610/612, e.g., to support receive diversity, or MIMO operation, or carrier aggregation on different frequencies. When connected to the CDMA 2000 1x wireless network 200, the single radio wireless communication device 102 can use the single transmitter 608 and either one receiver (Rx 610 or Rx 612) or both receivers (Rx 610 and Rx 612), e.g., for receive diversity. Use of dual receivers for both the LTE wireless network 300 and the CDMA 2000 1x wireless network 200 can provide higher receive signal quality and therefore higher data throughput and/or greater connection reliability under adverse signal conditions. In "good" signal conditions, however, use of both receivers can be not required, particularly when connected to or listening for signals from the CDMA 2000 1x wireless network 200. In some embodiments, the single radio wireless transmitter/receiver 614 can be configured to allow reception through a first receiver, e.g., Rx0 610, associated with a first wireless network, while also allowing reception through the second receiver, e.g., Rx1 612, associated with a second wireless network. An interconnect block 606 can be used to connect the LTE signal processing block 602 or the CDMA 2000 1x signal processing block 604 to the transmitter 608 and/or one or both of the receivers 610/612 respectively. Within the single radio wireless communication device 102, the single radio wireless transmitter/receiver 614 can be connected to an application processor (not shown) that can perform "higher layer" functions such as establishing connections for applications and forming messages to be communicated with various wireless networks, while the single radio wireless transmitter/receiver 614 can perform "lower layer" functions such as ensuring integrity of transmitted and received radio frequency signals that carry messages for the application processor.

Figure 7:
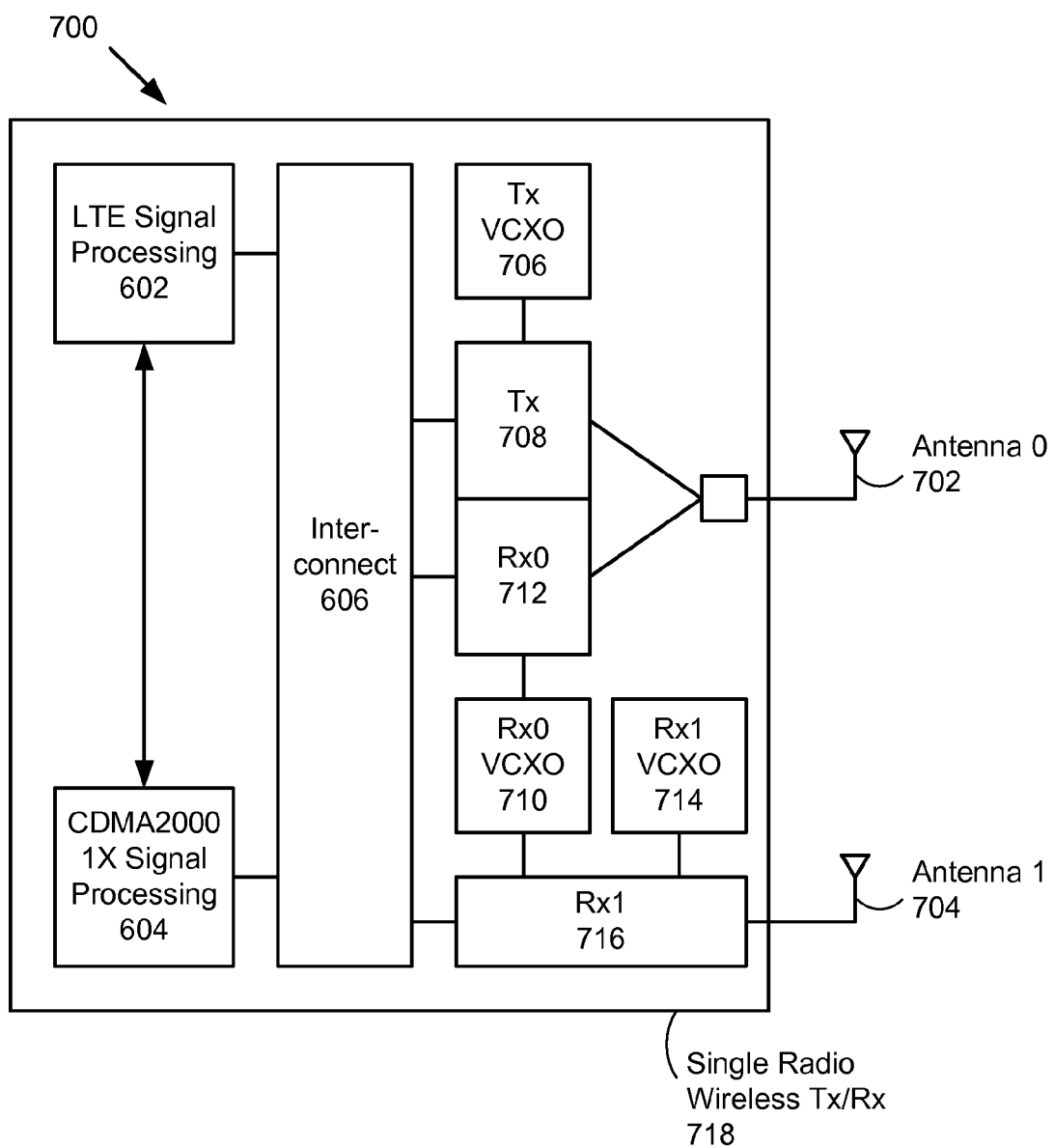
FIG. 7 illustrates another representative wireless communication device that includes a single signal processing chip that supports multiple wireless networks in accordance with some embodiments.

FIG. 7 illustrates a diagram 700 of another representative single radio wireless communication device 102 that includes a single radio wireless transmitter and receiver chip 718 that supports multiple wireless networks in accordance with some embodiments. The single radio wireless transmitter/receiver chip 718 can include a combination of hardware, firmware, and/or software to support wireless communication with multiple wireless networks that operate according to different wireless communication protocols. In an embodiment, the single radio wireless transmitter/receiver chip 718 includes an LTE signal processing block 602 and a CDMA 2000 1x signal processing block 604. An interconnect block 606 can provide connections between the LTE signal processing block 602 and a set of transmit and receive wireless circuitry, e.g., amplifiers, digital to analog converters, analog to digital converters, filters, voltage controlled crystal oscillators (VCXOs), antennas, and other wireless circuitry that can support the transformation of digital packets into radio frequency analog waveforms and back into digital packets. In some embodiments, the LTE signal processing block 602 can be connected to a transmitter (Tx) 708 and first receiver (Rx0) 712, which can operate as a pair for transmission and reception of radio frequency signals in accordance with an LTE wireless communication protocol. The LTE signal processing block can also be connected to a second receiver (Rx1) 716, which can also operate in cooperation with the transmitter 708 and the first receiver (Rx0) 712 to provide dual receiver capability, e.g., as used in MIMO reception and with receiver diversity. The first and second receivers 712/716 can be connected to the same VCXO (Rx0) 710, which can be tuned to an LTE carrier frequency. The LTE signal processing block 602 can use the transmitter 708 and both receivers 712/716 in a "mode 1" as described hereinabove. In some embodiments, the LTE signal processing block 602 can support a wireless communication protocol that uses carrier aggregation to combine information transmitted on two or more carrier frequencies.

In some embodiments, the second receiver (Rx1) 716 can be connected to a second VCXO (Rx1) 714 that provides a carrier frequency different from the carrier frequency provided by the first VCXO (Rx0) 710. The first and second carrier frequencies can be in the same frequency band or in different frequency bands when using carrier aggregation for LTE wireless reception at high data rates. In some embodiments, the second VCXO (Rx1) 714 can be tuned to a carrier frequency for use of a "legacy" wireless communication protocol, e.g., a CDMA 2000 1x wireless communication protocol, a UMTS wireless communication protocol, or a GSM wireless communication protocol. In an embodiment, the CDMA 2000 1x signal processing block 604 can be connected through the interconnect block 606 to the second receiver (Rx1) 716, which can be tuned to a separate carrier frequency for receiving signals (e.g., via antenna 704) in accordance with a CDMA 2000 1x wireless communication protocol from a CDMA 2000 1x wireless network 200. The LTE signal processing block 602 can be connected to the transmitter 708 and the first receiver (Rx0) 712, to transmit and receive signals with an LTE wireless network 300, e.g., via "antenna 0" 702, while the CDMA 2000 1x signal processing block 604 receives signals from a "non-LTE" wireless network in a "mode 2," e.g., via "antenna 1" 704. With only one receiver allocated for LTE communication, the single radio wireless communication device 102 can be unable to receive MIMO transmissions. In some embodiments, when reconfiguring from "mode 1" to "mode 2," the single radio wireless communication device 102 can communicate with the LTE wireless network 300 to indicate a preference for "non-MIMO" downlink communication, e.g., by providing a rank indicator (RI) value of 1 in a channel status report (CSR) or by providing another signaling control message to the LTE wireless network 300. By using two separate receivers (Rx0 712 and Rx1 716) tuned to two separate carrier radio frequencies, e.g., using separate VCXOs (Rx0 VCXO 710 and Rx1 VCXO 714) in parallel, the single radio wireless communication device 102 can maintain continuous bi-directional communication with the LTE wireless network 300 while listening for paging messages or receiving signals from another wireless network, e.g., CDMA 2000 1x wireless network 200. In some embodiments, the CDMA 2000 1x signal processing block 604 can be configured for a discontinuous receive (DRX) mode that periodically wakes from a "sleep" state and decodes paging messages from the CDMA 2000 1x wireless network 200 and/or measures signals from a non-LTE wireless network.

In some embodiments, the transmitter 708 and the first receiver (Rx0) 712 can be tuned from the LTE wireless network 300 to a legacy wireless network, e.g., the CDMA 2000 1x wireless network 200, in order to provide communication (transmission and reception) with the legacy wireless network while retaining a reception capability with the LTE wireless network 300 using the second receiver (Rx1) 716. In an embodiment, the transmit (Tx) VCXO 706 and the first receive VCXO (Rx0) 710 can be tuned to carrier frequencies associated with the CDMA 2000 1x wireless network 200, e.g., in order to perform a circuit switched fallback (CSFB) procedure to complete a mobile originated voice connection with the CDMA 2000 1x wireless network 200. The second VCXO (Rx1) 714 can remain tuned (or be retuned) to a carrier frequency associated with the LTE wireless network 300, while the transmitter and first receiver (Tx 708 and Rx0 712) are associated with wireless communication with the CDMA 2000 1x wireless network 200. Configuration of the single radio wireless communication device 102 in this "mode 3" operation and can provide the wireless communication device 102 with the capability to communicate fully with the CDMA 2000 1x wireless network 200 while continuing to receive signaling messages and/or measure radio frequency signals from the LTE wireless network 300 or from other parallel wireless networks. In some instances, communication with the CDMA 2000 1x wireless network 200 can be relatively short, e.g., providing a location area update or a short message service (SMS) communication, and communication with the LTE wireless network 300 can be restored by reconfiguring the wireless communication device 102 to the "mode 1" configuration relatively quickly. While communicating with the CDMA 2000 1x wireless network 200, the single radio wireless communication device 102 can continue to receive signaling messages from the LTE wireless network 300, e.g., on the Physical Downlink Control Channel (PDCCH) and/or the Physical Downlink Shared Channel (PDSCH), as signaling messages can be transmitted in the downlink direction from the LTE wireless network 300 using transmit diversity and can not require receive diversity or MIMO reception by the wireless communication device 102. The one receiver used in the "mode 3" configuration for receiving signals from the LTE wireless network 300 can suffice to receive signaling messages, which can be transmitted with receive diversity by the LTE wireless network 300. The wireless communication device 102 can also continue to receive layer 2/3 signaling messages (e.g., RRC messages) from the LTE wireless network 300 that are communicated using small packets that do not require MIMO transmission as can be used for large packets. By providing for reception of signaling messages from the LTE wireless network 300 while the wireless communication device 102 simultaneously communicates with the CDMA 2000 1x wireless network 200, the single radio wireless communication device 102 can be less likely to lose a connection with the LTE wireless network 300 and provide improved performance for a user of the wireless communication device 102. In some embodiments, the LTE signal processing block 602 can measure signals received through the second receiver 716 (Rx1) to determine cell characteristics (e.g., for a serving cell and/or for neighbor cells) to have better knowledge of performance when connecting and communicating with the LTE wireless network 300 (rather than encountering an unknown condition when returning from a configuration with no reception of signals from the LTE wireless network 300, e.g., when the transmitter 708 and both receivers 712/716 are allocated to a non-LTE wireless network, such as the CDMA 2000 1x wireless network 200). In some embodiments, the wireless communication device 102 can provide a mobile terminated or mobile originated voice connection with the CDMA 2000 1x wireless network 200 during which the wireless communication device 102 can operate the LTE signal processing block 602 in a discontinuous receive (DRX) mode, with intermittent reception of LTE signals and/or measurement of cells during "wake" time periods interspersed with "sleep" time periods.

In some embodiments, the wireless communication device 102 can determine a configuration in which to operate based on a measurement of signal strength, signal quality or another set of signal characteristics and metrics. When operating in an area with "good" signal coverage (with respect to the CDMA 2000 1x wireless network 200) and in response to a "tune away" event that requires use of at least one receiver for reception of signals from the CDMA 2000 1x wireless network 200, the wireless communication device 102 can operate in the "mode 3" configuration for a mobile originated voice connection, location area update, SMS communication, or other transmit/receive event with the CDMA 2000 1x wireless network 200, while retaining the second receiver (Rx1) 716 for use with the LTE wireless network 300. When operating in an area with "poor" signal coverage (with respect to the CDMA 2000 1x wireless network 200) and in response to the "tune away" event, the wireless communication device 102 can operate in the "mode 4" configuration that provides both receivers 712/716 and the transmitter 708 for communication with the CDMA 2000 1x wireless network 200. The wireless communication device 102 can opt for using receive diversity when operating in "poor" signal conditions to provide better reception of weak CDMA 2000 1x wireless signals or in the presence of high levels of noise and/or interference. The wireless communication device 102 can opt for using only a single receiver when operating in "good" signal conditions to permit continued reception of wireless signals from the LTE wireless network 300 while communicating simultaneously with the CDMA 2000 1x wireless network 200. In "good" signal conditions, the wireless communication device 102 can select "mode 2" when reception of signals from and no transmission of signals to the CDMA 2000 1x wireless network 200 is required. Full bi-directional communication (excepting MIMO reception) with the LTE wireless network 300 can continue while operating the single radio wireless communication device 102 in the "mode 2" configuration. In an instance when the CDMA2000 1x signal processing block 604 receives a paging message while in "mode 2" from the CDMA 2000 1x wireless network 200, the wireless communication device 102 can be reconfigured to either "mode 3" or "mode 4" to provide bi-directional communication with the CDMA 2000 1x wireless network 200. Selecting whether to use "mode 3" or "mode 4" for communication between the wireless communication device 102 and the CDMA 2000 1x wireless network 200 can depend on a set of signal conditions being satisfied, e.g., "good" signal coverage allowing for using a first receiver with the LTE wireless network 300 and a second receiver with the CDMA 2000 1x wireless network 200, while "poor" signal coverage requiring use of both receivers for the CDMA 2000 1x wireless network 200. Upon completion of the "tune away" event, e.g., completion of the mobile originated or mobile terminated voice connection, completion of the location area update or SMS communication, the wireless communication device 102 can be reconfigured back to use the LTE wireless network 300, e.g., in a "mode 1" configuration that permits full reception of signals from the LTE wireless network 300 including MIMO operation or in a "mode 2" configuration that uses only one receiver for reception of signals from the LTE wireless network 300 and retains the other receiver for signals received from the CDMA 2000 1x wireless network 200. In some embodiments, the wireless communication device 102 can monitor the PDCCH and/or PDSCH channels for information about a format for downlink transmissions from the LTE wireless network 300, which can indicate whether MIMO downlink transmission is being used, and the wireless communication device 102 can select an operational mode appropriately. If the wireless communication device 102 prefers to operate with one receiver assigned to each of two different wireless networks, the wireless communication device 102 can communicate a rank indication of 1 to the LTE wireless network 300, e.g., using the rank indicator portion of a channel status report message, to indicate a preference to not receive MIMO rank 2 (or higher rank) downlink transmissions. In an instance when the wireless communication device 102 is presently receiving MIMO downlink transmissions, e.g., in a rank 2 MIMO configuration, the wireless communication device 102 can communicate a rank indicator value of 1 to the LTE wireless network 300 before switching one of the receivers over to provide reception of signals from the CDMA 2000 1x wireless network 200.

Figure 8:
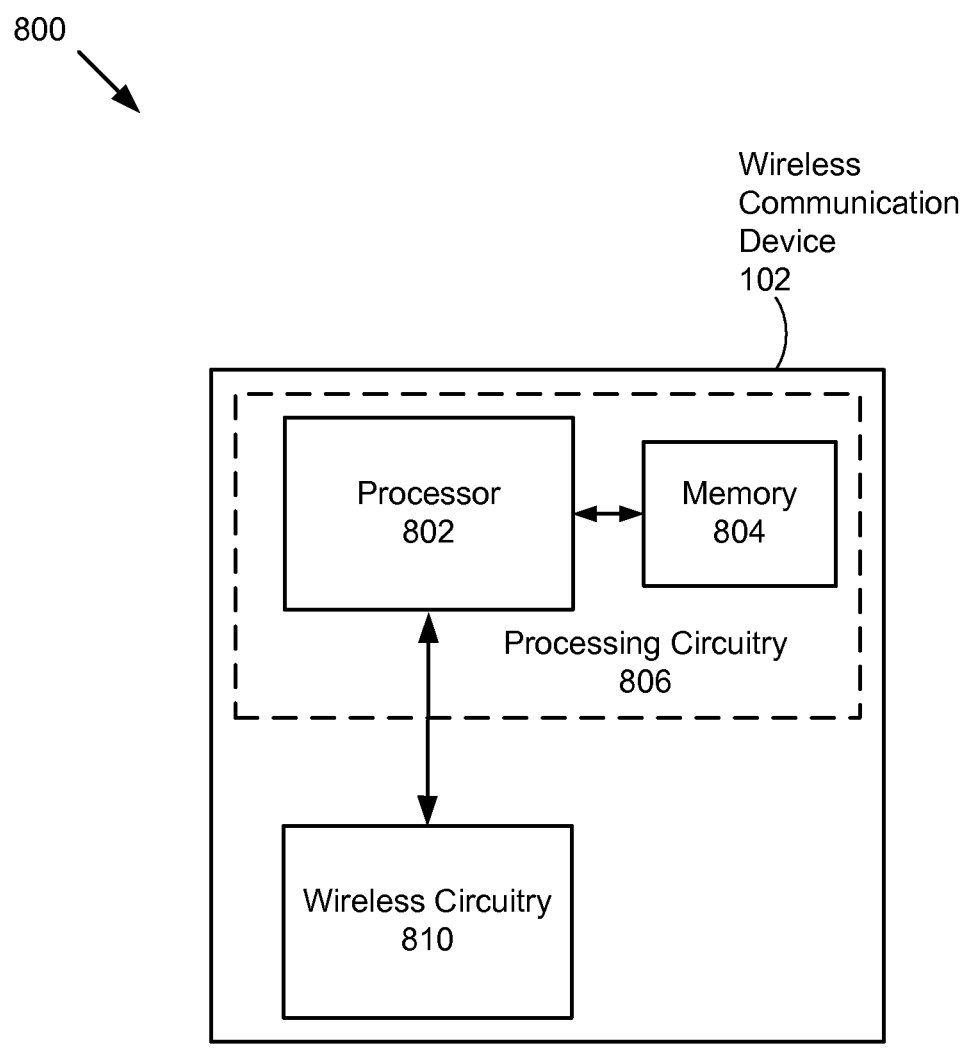
FIG. 8 illustrates a representative set of processing elements of a wireless communication device in accordance with some embodiments.

FIG. 8 illustrates a diagram 800 of a representative set of processing elements of a single radio wireless communication device 102 in accordance with some embodiments. The wireless communication device 102 can include a set of wireless circuitry 810 that can provide for communication with multiple wireless networks, e.g., the LTE wireless network 300 and the CDMA 2000 1x wireless network 200. The wireless circuitry 810 in the wireless communication device 102 can include one or more wireless circuitry modules including processors and wireless circuitry to transmit and receive wireless signals according to various wireless communication protocols. A wireless circuitry module (which can also be referred to as a wireless subsystem) of the wireless communication device 102 can include transmitters and receivers to provide signal processing of radio frequency wireless signals formatted according to wireless communication protocols, e.g., according to an LTE wireless communication protocol, a CDMA 2000 1x wireless communication protocol, or another cellular wireless communication protocol. In some embodiments, the wireless circuitry module can include components such as: processors and/or specific-purpose digital signal processing (DSP) circuitry for implementing functionality such as, but not limited to, baseband signal processing, physical layer processing, data link layer processing, and/or other functionality; one or more digital to analog converters (DACs) for converting digital data to analog signals; one or more analog to digital converters (ADCs) for converting analog signals to digital data; radio frequency (RF) circuitry (e.g., one or more amplifiers, mixers, filters, phase lock loops (PLLs), and/or oscillators); and/or other components. The wireless circuitry module can be also referred to as a radio in some embodiments.

The wireless circuitry 810 of the single radio wireless communication device 102 of FIG. 8 can include wireless processing blocks, as illustrated in FIG. 7, in some embodiments. The wireless circuitry 810 of the wireless communication device 102 can be connected to high layer processing circuitry 806 that includes a host/application processor 802 connected to memory 804. In some embodiments, the wireless circuitry 810 includes its own wireless control processor. In some embodiments, the wireless circuitry 810 can be controlled by one or more processors contained therein and/or by the host/application processor 802 to be configured in one of the four different operating modes described hereinabove. In some embodiments, the wireless circuitry 810 is configured to switch between different operating modes based on requirements for communication with two or more different wireless networks, e.g., the LTE wireless network 300 and the CDMA 2000 1x wireless network. The wireless circuitry 810 can be configured to switch between different operating modes that provide for single receiver reception from one wireless network and simultaneous single receiver reception from another wireless network. In some embodiments, the wireless circuitry 810 can be configured for different operating modes based on a set of signal conditions, e.g., measurements of receive signal strength and/or quality for one or more wireless networks. In some embodiments, the wireless circuitry 810 can be configured for different operating modes based on an operation to be performed, e.g., to originate a voice connection, to receive a paging message, to provide a location update, to transmit and/or receive an SMS message, to receive an incoming voice connection, to measure a serving cell, to measure one or more neighbor cells, etc.

Figure 9:
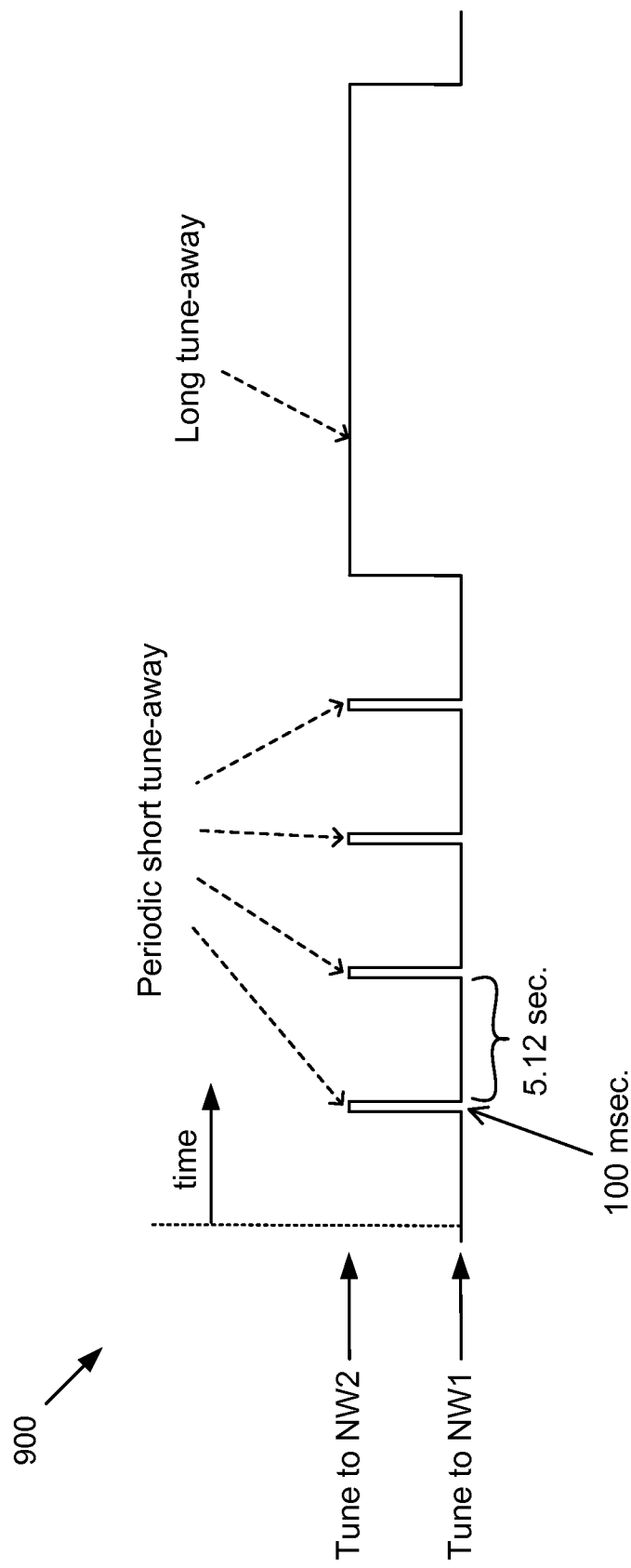
FIG. 9 illustrates a diagram of a set of radio frequency tune away events for a wireless communication device that communicates with two different wireless networks in accordance with some embodiments.

FIG. 9 illustrates a diagram 900 of a set of radio frequency tune-away events for a wireless communication device 102 that communicates with two different wireless networks (NW1 and NW2) in accordance with some embodiments. The wireless communication device 102 can be configured to communicate with the first wireless network NW1 (e.g., the LTE wireless network 300) and during a short time period tune at least one receiver in the wireless communication device 102 to listen for signals from and/or transmit a short message or location update to the second wireless network NW2 (e.g., the CDMA 2000 1x wireless network 200). For a short tune-away time period, the connection with the LTE wireless network 300 can be interrupted without a loss of the LTE connection, i.e., the wireless communication device 102 can return from the short tune-away event to resume communication with the LTE wireless network 300. In some embodiments, the wireless communication device 102 can determine to use a first receiver associated with a transmitter during the short tune-away event, e.g., for providing a location area update or an SMS message to the CDMA 2000 1x wireless network 200. In some embodiments, the wireless communication device 102 can simultaneously continue to use a second receiver with the LTE wireless network 300 while communicating with the CDMA 2000 1x wireless network 200 during the short tune-away event. The wireless communication device 102 can determine whether to use a receiver only or a transmitter and a receiver for communication during the tune-away event based on actions to be performed during the tune-away event. In some embodiments, the wireless communication device 102 can tune multiple receivers to the second wireless network, e.g., the CDMA 2000 1x wireless network 200, during the tune-away event, e.g., when a set of signal conditions indicate that reception of signals from the CDMA 2000 1x wireless network 200 can require receive diversity. During a tune-away event, the wireless communication device 102 can change the use of receivers, e.g., between two different receivers and/or from the use of one receiver to the use of two receivers based on actions undertaken, received signals, received messages, or other conditions. In an embodiment, the wireless communication device 102 can tune a first receiver to the CDMA 2000 1x wireless network 200 to listen for a paging event, and in response to receiving a paging message can reconfigure the wireless communication device to use both a transmitter and a receiver (or multiple receivers) to establish a mobile terminated voice connection with the CDMA 2000 1x wireless network 200. In an embodiment, the wireless communication device can receive a message from the LTE wireless network 300 in advance of a tune-away event that indicates an incoming voice connection on the CDMA 2000 1x wireless network 200, and the wireless communication device 102 can tune one or more receivers and a transmitter to establish a connection with the CDMA 2000 1x wireless network 200 during the tune-away event. A voice connection with the CDMA 2000 1x wireless network 200 can be represented as a "long" tune-away event as illustrated in FIG. 9. In some embodiments, the wireless communication device 102 can determine a number of receivers to use for the voice connection during the tune-away event based on a set of measured signal metrics for the CDMA 2000 1x wireless network, e.g., a measure of signal strength and/or signal quality that can indicate whether the wireless communication device 102 operates in an area of "good" signal coverage or an area of "poor" signal coverage. In some embodiments, the wireless communication device 102 determines whether to use one or multiple receivers during the tune-away event based on comparing one or more receive signal metrics to one or more thresholds. In some embodiments, in an instance when reconfiguring from the use of multiple receivers by the LTE wireless network 300 to use of a single receiver by the LTE wireless network 300, the wireless communication device 102 can provide an indication to the LTE wireless network 300, e.g., through one or more signaling messages, of a preference to receive communication through only one receiver, e.g., a preference for downlink transmit diversity rather than MIMO transmission. In some embodiments, the wireless communication device 102 communicates the preference using a rank indicator in a channel status report message provided to the LTE wireless network 300 in advance of the tune-away event.

Figure 10:
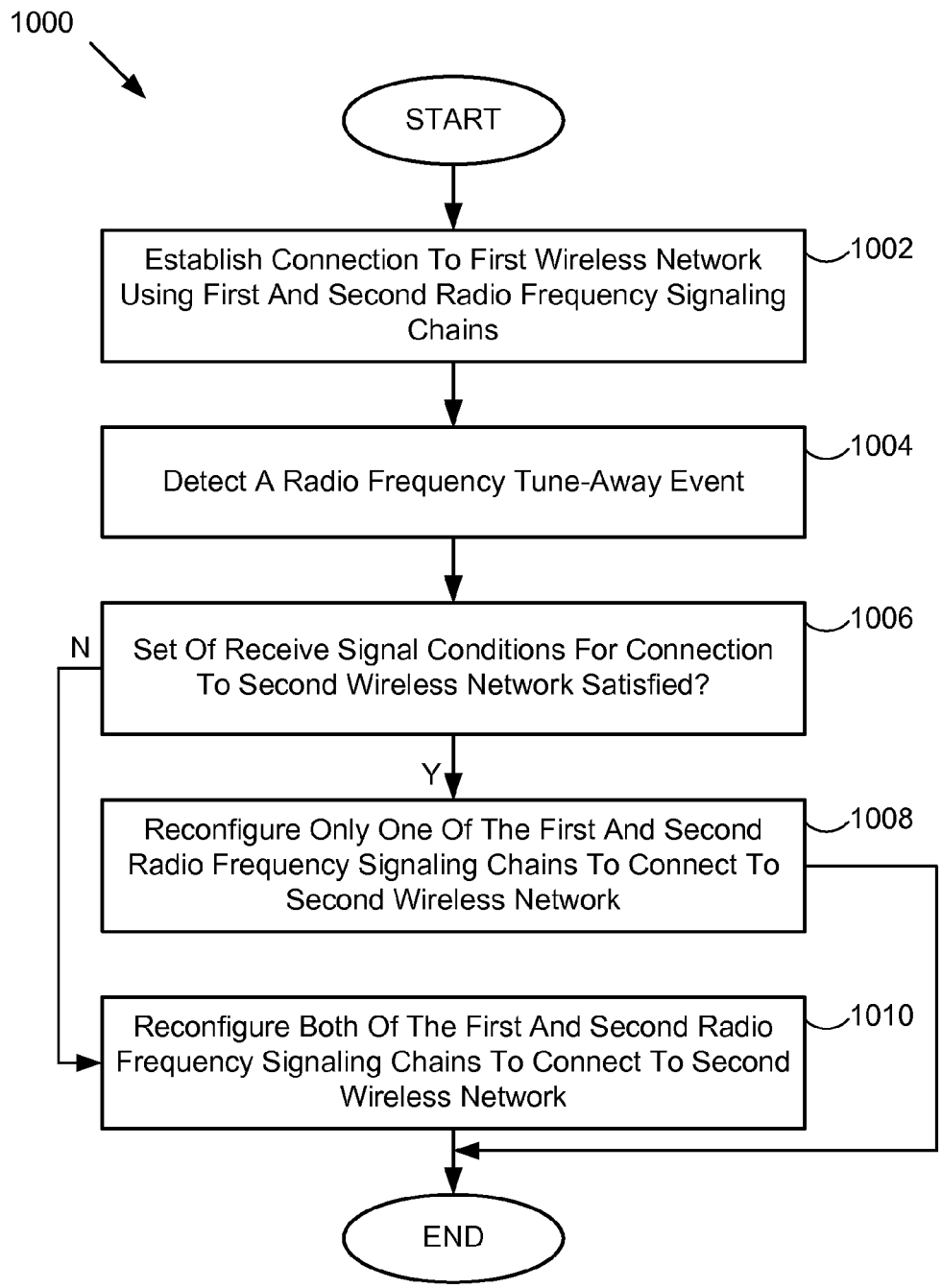
FIG. 10 illustrates a representative embodiment to configure wireless circuitry in a single radio wireless communication device to receive signals from two wireless networks simultaneously in accordance with some embodiments.

FIG. 10 illustrates a flow chart 1000 of a representative embodiment to configure wireless circuitry in a single radio wireless communication device 102 to receive signals from two wireless networks simultaneously in accordance with some embodiments. In an embodiment, a first wireless network operates in accordance with a long term evolution (LTE) wireless communication protocol, e.g., the LTE wireless network 300, and a second wireless network operates in accordance with a "legacy" third generation (3G) wireless communication protocol, e.g., the CDMA 2000 1x wireless network 200. In a first step 1002, the wireless communication device 102 establishes a connection with the first wireless network using a first radio frequency signaling chain and a second radio frequency signaling chain. In an embodiment, the first and second radio frequency signaling chains include at least wireless circuitry 810 as illustrated in FIG. 8 and described hereinabove, or a set of receivers (Rx0, Rx1) 712/716 and associated voltage controlled crystal oscillators (VCXOs) 710/714 as illustrated in FIG. 7 and described hereinabove. In some embodiments, a radio frequency signaling chain can also be referred to as a receiver, a receive signaling chain, or a receive portion of wireless circuitry in a wireless communication device 102. In step 1004, the wireless communication device 102 detects a radio frequency tune-away event. In some embodiments, the radio frequency tune-away event corresponds to a time period during which the wireless communication device 102 reconfigures during a "wake" cycle of a discontinuous receive (DRX) cycle to listen for signals (e.g., page messages) or to measure signals (e.g., for cell selection/reselection) from the second wireless network. In some embodiments, the tune-away event is associated with establishing a connection for a mobile originated or mobile terminated voice connection with the second wireless network. In step 1006, the mobile wireless device 102 determines whether a set of receive signal conditions for connection to the second wireless network is satisfied. In some embodiments, the set of receive signal conditions is satisfied when a receive signal quality, a receive signal strength, or one or more other receive signal metrics exceed a set of threshold values. When the set of receive signal conditions is satisfied, the wireless communication device 102 reconfigures only one radio frequency signaling chain to connect to the second wireless network. In an embodiment, the wireless communication device 102 selects which of the radio frequency signaling chains to reconfigure based at least in part on whether a transmitter is required during the tune-away event. For example, when at least one signaling message or data message is required to be transmitted during the tune-away event to the second wireless network, the radio frequency signaling chain(s) associated with a transmitter can be reconfigured for use during the tune-away event with the second wireless network. In some embodiments, the first radio frequency signaling chain is associated with a transmitter, while the second radio frequency signaling chain is not associated with the transmitter of the wireless communication device 102. In an embodiment, the set of receive signal conditions being satisfied indicates "good" signal coverage, e.g., a receive signal strength or receive signal quality exceeds a threshold, and the wireless communication device 102 can receive signals from the second wireless network reliably with only one receiver. In some embodiments, the set of receive signal conditions not being satisfied indicates "poor" signal coverage, e.g., the receive signal strength or receive signal quality fall below a threshold, and the wireless communication device 102 can require receive diversity as provided by multiple receivers in order to reliably receive signals from the second wireless network. In step 1010, when the set of receive signal conditions for connection to the second wireless network is not satisfied, the wireless communication device 102 reconfigures both of the first and second radio frequency signaling chains to connect with the second wireless network. In some embodiments, the wireless communication device 102 configures a transmitter in accordance with requirements for communication with the first wireless network or the second wireless network during the tune-away event. In some embodiments, the wireless communication device determines which wireless network in a set of wireless networks with which to associate a radio frequency signaling chain in a set of radio frequency signaling chains in the wireless communication device based at least in part on requirements for communication with the wireless network, a set of receive signal conditions for the wireless network, and/or a prioritization for communication among the wireless networks in the set of wireless networks. In an embodiment, the set of wireless networks includes a first wireless network operating in accordance with an LTE wireless communication protocol and a second wireless network operating in accordance with a legacy 3G wireless communication protocol, the first wireless network providing packet switched connections only, and the second wireless network providing at least circuit switched connections. In an embodiment, the second wireless network provides voice connections for a CSFB procedure for the first wireless network. In some embodiments, connections to the second wireless network take priority over connections to the first wireless network.

Representative applications of systems, methods, apparatuses, and computer program products according to the present disclosure are described in this section hereinabove. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the detailed description provided, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Software, hardware, or a combination of hardware and software can implement various aspects of the described embodiments. The described embodiments can also be encoded as computer program code on a non-transitory computer readable medium. The non-transitory computer readable medium is any data storage device that can store data that can thereafter be read by a computer system. Examples of the non-transitory computer readable medium include read-only memory, random-access memory, CD-ROMs, DVDs, magnetic tape and optical data storage devices. The computer program code can also be distributed over network-coupled computer systems so that the computer program code is stored and executed in a distributed fashion.

The various aspects, embodiments, implementations or features of the described embodiments can be used separately or in any combination. The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. A method to configure wireless circuitry in a wireless communication device, the method comprising:
   by the wireless communication device:
      establishing a connection to a first wireless network using a plurality of radio frequency signaling chains; and
      in response to detecting an event that will cause an interruption of the connection to the first wireless network:
         reconfiguring only one radio frequency signaling chain of the plurality of radio frequency signaling chains to a second wireless network when a set of receive signal conditions for a second wireless network is satisfied, and
         reconfiguring at least two radio frequency signaling chains of the plurality of radio frequency signaling chains to the second wireless network when the set of receive signal conditions for the second wireless network is not satisfied.

2. The method as recited in claim 1, wherein detecting the event that will cause the interruption of the connection to the first wireless network comprises obtaining a mobile terminated page indication from the first wireless network for a connection on the second wireless network.

3. The method as recited in claim 1, wherein the event that will cause the interruption of the connection to the first wireless network comprises a discontinuous receive (DRX) wake time period.

4. The method as recited in claim 1, wherein the event that will cause the interruption of the connection to the first wireless network comprises a radio frequency tune-away event.

5. The method as recited in claim 1, wherein at least one radio frequency signaling chain that is reconfigured by the wireless communication device to the second wireless network comprises a transmitter, when the event that will cause the interruption of the connection to the first wireless network requires the wireless communication device to send at least one transmission to the second wireless network.

6. The method as recited in claim 1, further comprising:
   maintaining a transmitter of at least one of the plurality of radio frequency signaling chains to communicate with the first wireless network, when the event that will cause the interruption of the connection to the first wireless network does not require the wireless communication device to send at least one transmission to the second wireless network.

7. The method as recited in claim 1, wherein the set of receive signal conditions for the second wireless network is satisfied when a receive signal strength or a receive signal quality for the second wireless network exceeds a threshold value.

8. The method recited in claim 1, wherein the first wireless network operates in accordance with a long term evolution (LTE) or long term evolution advanced (LTE-A) wireless communication protocol, and the second wireless network operates in accordance with a legacy wireless communication protocol.

9. The method as recited in claim 1, further comprising:
   in response to receiving a mobile terminated paging message from the second wireless network during the interruption of the connection to the first wireless network, reconfiguring a transmitter of at least one radio frequency signaling chain to the second wireless network.

10. The method as recited in claim 1, further comprising:
    when the set of receive signal conditions for the second wireless network is satisfied, sending a channel status report that includes a rank indicator value of "one" to the first wireless network in advance of the interruption of the connection to the first wireless network.

11. A wireless communication device comprising:
    one or more processors configured to control establishing and releasing connections between the wireless communication device and a first wireless network and between the wireless communication device and a second wireless network;
    a transmitter configurable to transmit signals to the first wireless network or to the second wireless network;
    a plurality of receivers, configurable to receive signals from the first wireless network or from the second wireless network, comprising at least one receiver associated with the transmitter and at least one receiver not associated with the transmitter; and
    wherein the one or more processors are further configured to:
       establish a connection to the first wireless network using the transmitter and at least one of the plurality of receivers;
       in response to detecting an event that will cause an interruption of the connection to the first wireless network and when a set of receive signal conditions for the second wireless network is satisfied, reconfigure at least one of the plurality of receivers to the second wireless network and maintain at least one of the plurality of receivers configured to receive from the first wireless network.

12. The wireless communication device recited in claim 11, wherein the one or more processors are further configured to:
    when the event that will cause the interruption of the connection to the first wireless network requires transmission to the second wireless network and the set of receive signal conditions for the second wireless network is satisfied, reconfigure the transmitter to the second wireless network.

13. The wireless communication device recited in claim 11, wherein the one or more processors are further configured to:
    when the event that will cause the interruption of the connection to the first wireless network does not require transmission to the second wireless network, maintain the transmitter configured to communicate with the first wireless network.

14. The wireless communication device recited in claim 11, wherein the one or more processors are further configured to:
in response to detecting the event that will cause the interruption of the connection to the first wireless network, reconfigure at least two of the plurality of receivers to the second wireless network, when the set of receive signal conditions for the second wireless network is not satisfied.

15. The wireless communication device recited in claim 11, wherein the first wireless network operates in accordance with a long term evolution (LTE) wireless communication protocol or long term evolution advanced (LTE-A) wireless communication protocol, and the second wireless network operates in accordance with a legacy wireless communication protocol.

16. The wireless communication device recited in claim 11, wherein the one or more processors are configured to detect the event that will cause the interruption of the connection to the first wireless network by obtaining an indication of a mobile terminated voice connection to be established with the second wireless network.

17. The wireless communication device recited in claim 11, wherein the one or more processors are configured to detect the event that will cause the interruption of the connection to the first wireless network by obtaining an indication of a wake time period for a discontinuous receive (DRX) cycle for communication with the second wireless network.

18. The wireless communication device recited in claim 11, wherein the set of receive signal conditions for the second wireless network is satisfied when a measurement of a signal strength or a signal quality for signals received from the second wireless network exceeds a threshold value.

19. A non-transitory storage device storing computer-executable instructions that, when executed by one or more processors, cause a wireless communication device to:
establish a connection to a first wireless network using a transmitter and a plurality of receivers;
detect an event that will cause an interruption of the connection to the first wireless network;
in response to detecting an event that will cause an interruption of the connection to the first wireless network:
when a set of receive signal conditions for a second wireless network is satisfied, reconfigure at least one receiver to a second wireless network and maintain at least one receiver connected to the first wireless network; and
when the set of receive signal conditions for the second wireless network is not satisfied, reconfigure at least two receivers to the second wireless network.

20. The non-transitory storage device as recited in claim 19, wherein the computer-executable instructions, when executed by the one or more processors, further cause the wireless communication device to:
send a channel status report that includes a rank indicator value of "one" to the first wireless network before the event that will cause the interruption of the connection to the first wireless network.

* * * * *